May 28, 1968 L. O'RUSSA 3,385,281
CHARCOAL COOKER
Filed Feb. 25, 1966 2 Sheets-Sheet 2
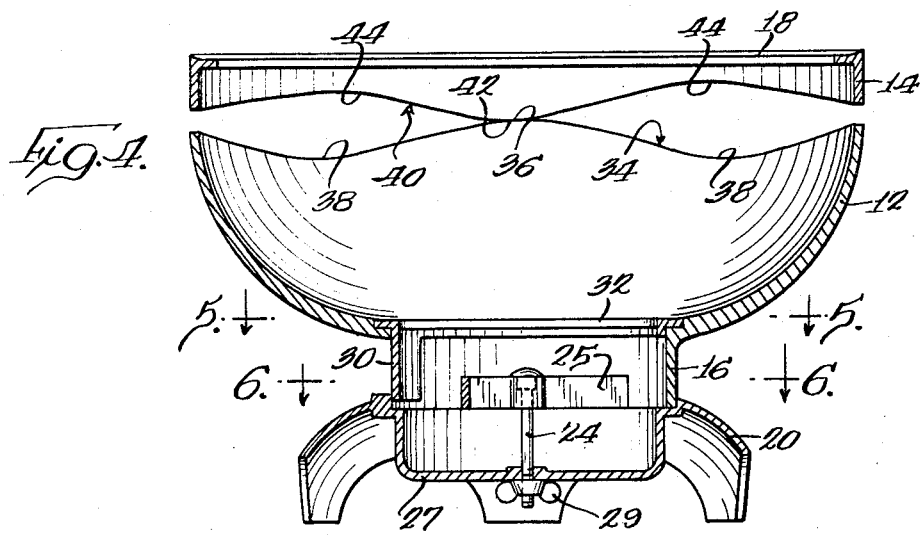
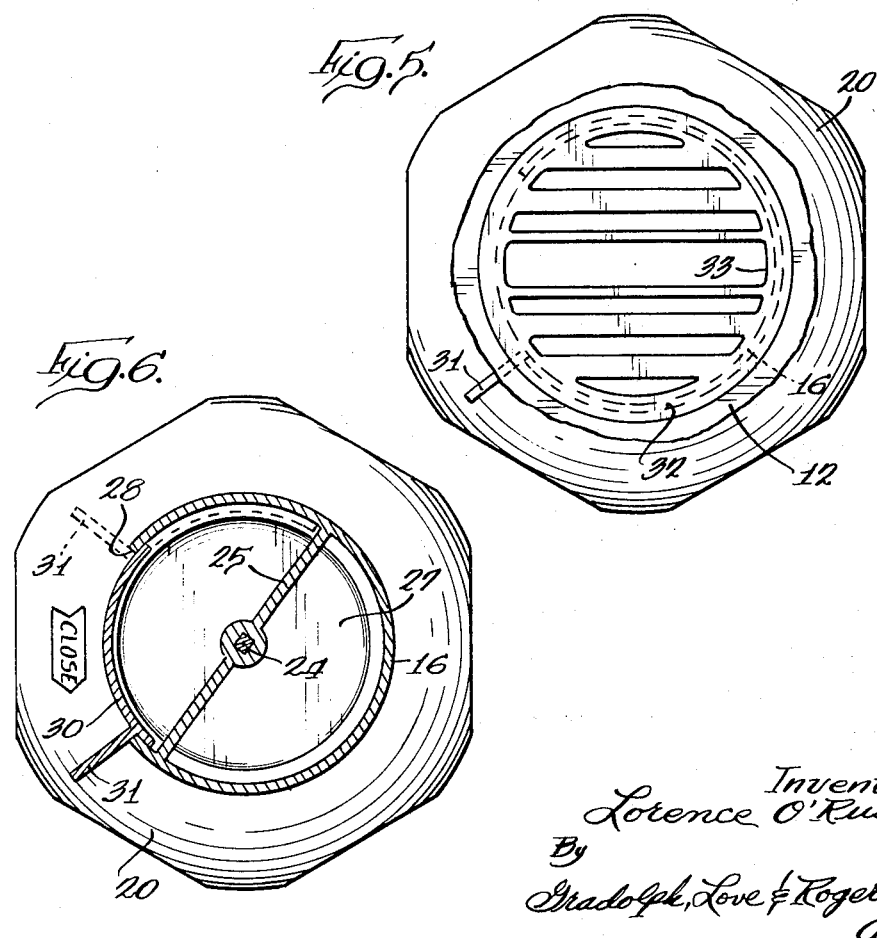
Inventor:
Lorence O'Russa
By
Gradolph, Love & Rogers
Att'ys 3,385,281
CHARCOAL COOKER
Lorence O'Russa, 5309 Prospect, Peoria, Ill. 61611
Filed Feb. 25, 1966, Ser. No. 529,999
5 Claims. (Cl. 126—25)

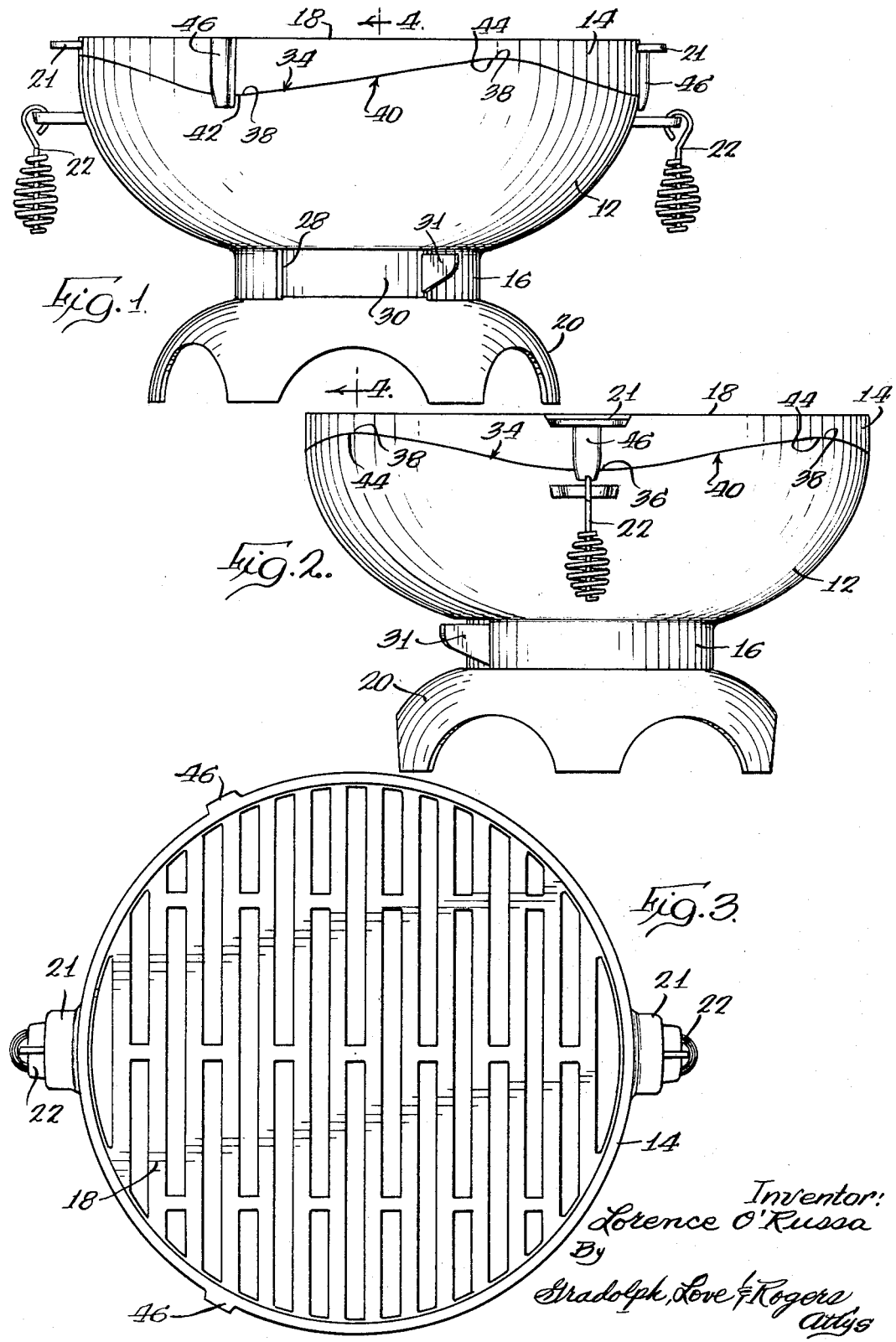

ABSTRACT OF THE DISCLOSURE

The charcoal cooker comprises a bowl shaped fire pot having a grate at its bottom center and a damper door to control the draft. The upper edge of the fire pot is regularly scalloped, and the lower edge of a grill support is complementally scalloped, so that by rotating the grill relative to the fire pot the spacing between the grill support is varied from closed to maximum venting. Depending fingers carried on the grill support engage the outer surface of the fire pot and guide and center the grill relative thereto.

---

In general, the invention relates to a charcoal cooker having separable parts of a grate and a fire pot. The top and bottom of each of these are provided with a scalloped edge to vary the air opening and the draft and broiling rate in the charcoal cooker. Turning the grill on this round cooker allows the opening between the grill and fire pot to be varied between completely closed, to a small opening, to the maximum opening allowed by the scallops. The number of raised and lower portions or scallops can be any number from three or more. Alternatively, edges with a rough or sawtooth design to hold the grill in various positions may be used.

The primary object of the invention is to provide a new and improved charcoal cooker having a grill and a fire pot whereby the spacing between these portions may be varied by turning the grill and fire pot relative to each other.

A further object of this invention is to provide a charcoal cooker adapted to vary the air openings between the grill and fire pot by relative rotation.

Other objects, advantages and capabilities of the invention will become apparent from the following description taken in conjunction with the accompanying drawings showing only a preferred embodiment of the invention.

In the drawings:

FIG. 1 is a front elevational view of the invention applied to a charcoal cooker;

FIG. 2 is a side elevational view of the embodiment of FIG. 1;

FIG. 3 is a plan view of the charcoal cooker of FIGS. 1 and 2;

FIG. 4 is a medial sectional view of the charcoal cooker of FIGS. 1 to 3 showing the parts in changed position and may be considered as taken along the line 4—4 of FIG. 1;

FIG. 5 is a horizontal sectional view taken along the line 5—5 of FIG. 4; and

FIG. 6 is a horizontal sectional view taken along the line 6—6 of FIG. 4.

Referring to FIGS. 1 to 6, the charcoal cooker has a fire pot 12, a grill support 14 and its grill 18, a vent neck 16, and a supporting base 20. The neck 16 is cylindrical and integral with the fire pot 12 and supports the latter on the base 20. Pairs of handles 21 and 22 are on the grill support 14 and fire pot 12, respectively. At one side thereof it has a vent opening 28 which may be completely or partly closed by an arcuate damper door 30 which has a manipulating handle 31. A bolt 24 extends through a spider 25 lying internally of and integral with the neck 16 and through an opening in the center of a fire box 27 and, with its wing nut 29, holds the assembly of the fire pot 12, vent neck 16, support base 20 and fire box 27 together. They may be readily disassembled for cleaning or compacting for storing and shipping.

A charcoal supporting grate 32 fits into the upper end of the neck and has a diametrical trough 33 to hold liquid or jellied primer fuel. The draft through the burning and glowing coals can be regulated by the proper adjustment of the damper door 30. The fire box 27 catches ash and any other material falling through the grate 32.

The fire pot 12 is formed with an upper edge 34 of regular configuration having high points at 36 and low points at 38. The grill support 14 has a lower edge 40 shaped complementally to the edge 34 with high points 42 and low points 44, that is, farthest from and closest to the grill 18. A set of guide fingers 46 welded to or formed integrally with the grill support 14 project downwardly at spaced positions at the outer surface of the grill support and engage the outer face of the fire pot 12 to hold the grill support centered on top of the fire pot, and they act as guides when the grill support is rotated relative to the fire pot 12.

FIGS. 1 and 2 show the grill 18 in lowered position with the fire pot top edge 34 in engagement all along its length with the grill support edge 40. The grill support 14 may be rotated relative to the fire pot 12, and as it is, the high points 42 on the lower edge 40 of the grill support 14 leave the low points 38 on the top edge 34 of the fire pot 12 and ride up toward its high points 36. This increases the opening between the grill support 14 and fire pot 12 to increase the draft through the fire pot. The maximum spacing distance is shown in FIG. 4. Varying the draft and changing the distance between the grill 18 and the burning and glowing charcoal affect the rate of combustion and the heat applied to whatever is on the grill.

Various modifications may be made in the invention without departing from the spirit or scope thereof and it is desired therefore that only such limitations shall be placed thereon as are imposed by the prior art and are set forth in the appended claims.

I claim:
1. A charcoal cooker comprising a bowl shaped fire pot having a circular scalloped upper edge, a grill having a circularly depending support formed with a scalloped lower edge adapted to engage said upper edge of said fire pot, said bottom and top edges being regular and complementary, whereby rotating said grill relative to said fire pot varies the spacing and air opening between said bottom fire pot and said grill from closed to maximum venting, and means to maintain said grill and said fire pot centered relative to each other.

2. A charcoal cooker as recited in claim 1, wherein said scalloped edges have at least three scallops.

3. A charcoal cooker as recited in claim 1, wherein there is provided at the bottom of said fire pot a grate to support charcoal, said grate having a trough to hold primer fuel.

4. A charcoal cooker as recited in claim 3, wherein said fire pot is supported by a means containing an opening having a damper door to control the draft to the charcoal.

5. A charcoal cooker as recited in claim 1, wherein said means to maintain said grill and said fire pot centered relative to each other comprises a plurality of depending fingers carried on said grill at the lowest portions of said grill edge and engaging the outer surface of said fire pot.

References Cited

UNITED STATES PATENTS

| | | | |
|---|---|---|---|
| 2,134,759 | 11/1938 | Howlett | 220—44 |
| 2,371,410 | 3/1945 | Rickenbacher | 126—261 |
| 2,385,643 | 9/1945 | Place | 220—43 X |
| 2,454,455 | 11/1948 | Irwin | 206—41 |

FOREIGN PATENTS 1,320,649  1/1963  France.

FREDERICK KETTERER, *Primary Examiner.*